United States Patent [19]

Zwach

[11] Patent Number: 4,696,285

[45] Date of Patent: Sep. 29, 1987

[54] SOLAR COOKER

[76] Inventor: David M. Zwach, 518 North State, New Ulm, Minn. 56073

[21] Appl. No.: 798,473

[22] Filed: Nov. 15, 1985

[51] Int. Cl.[4] .................................................. F24J 3/02
[52] U.S. Cl. ..................................... 126/451; 126/438; 126/439; 126/424
[58] Field of Search ............... 126/451, 438, 417, 439, 126/424

[56] References Cited

U.S. PATENT DOCUMENTS

| | | | |
|---|---|---|---|
| 3,171,403 | 3/1965 | Drescher | 126/451 |
| 3,938,497 | 2/1976 | Andrassy | 126/451 |
| 4,086,485 | 4/1978 | Kaplom et al. | 126/451 |
| 4,111,184 | 9/1978 | Perkins | 126/451 X |
| 4,446,854 | 5/1984 | Clevett et al. | 126/451 |

Primary Examiner—Larry Jones
Attorney, Agent, or Firm—Clayton R. Johnson

[57] ABSTRACT

A solar cooker that includes an insulated oven, a main reflector joined to the oven which reflects solar radiation to a secondary reflector that in turn reflects the radiation into the oven; a gimbal, arcuate track and subframe arrangement mounting the oven on the main frame for movement for adjustments for azimuth, declination and latitude; a removable inner container mounted in the oven and having mounted therein an electric coil and a gimbal arrangement for mounting a pan for containing the food to be cooked and a cover for the container.

16 Claims, 7 Drawing Figures

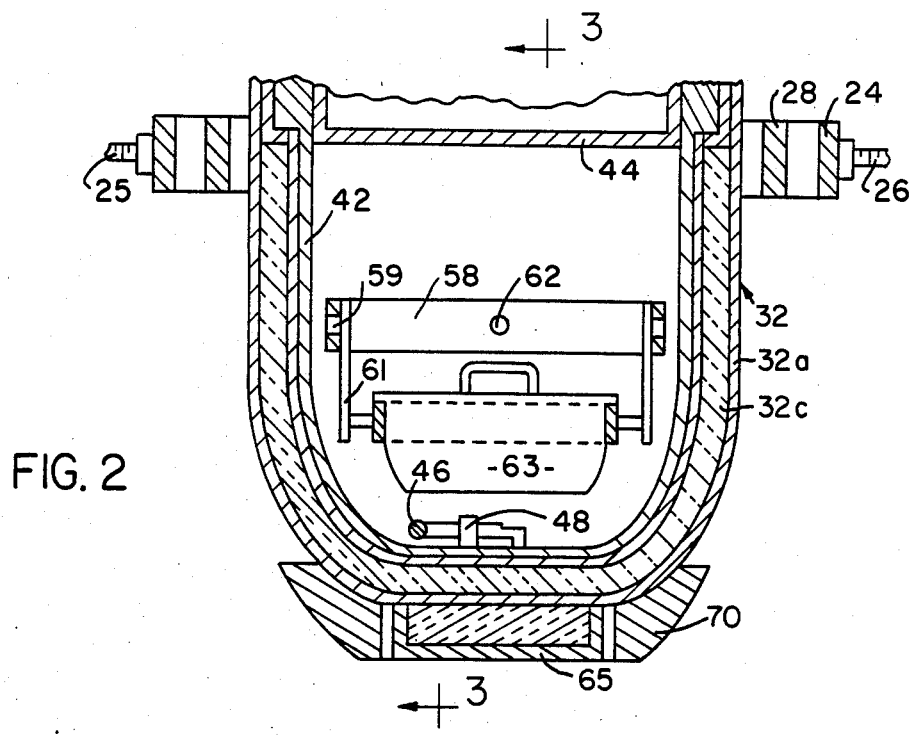
FIG. 2
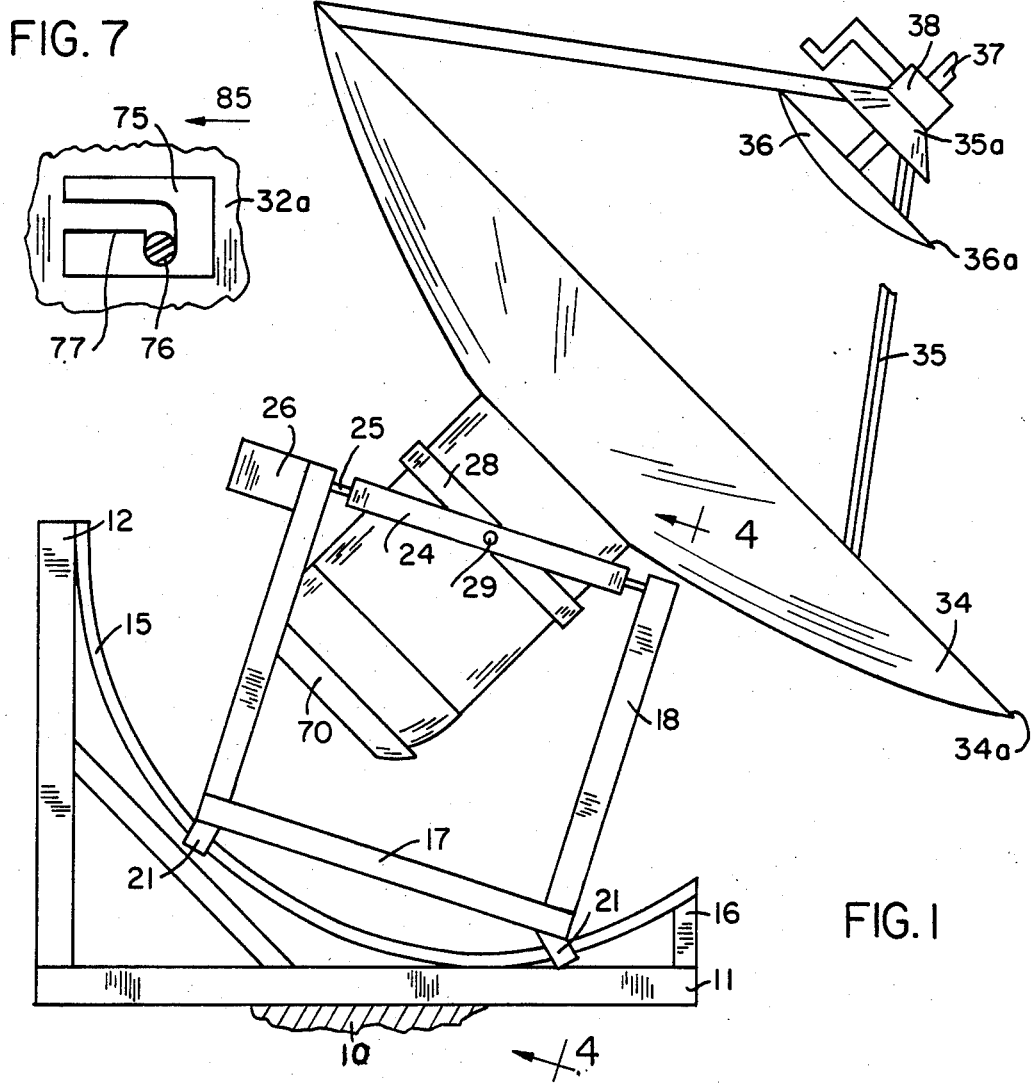
FIG. 7
FIG. 1

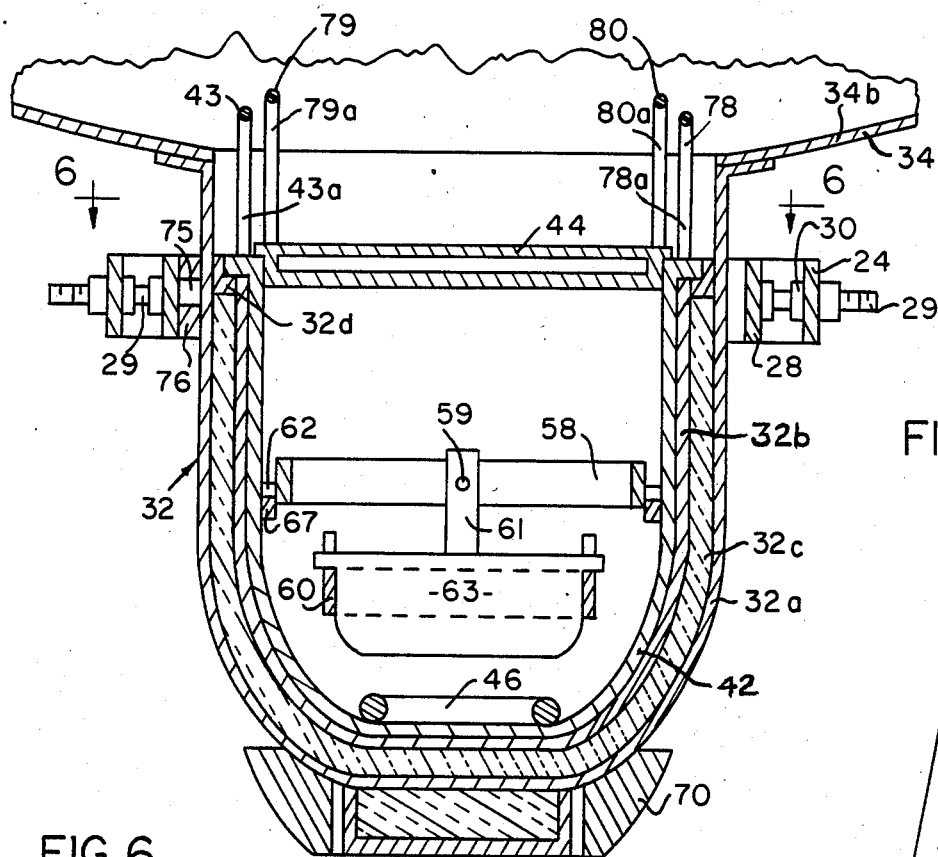
FIG. 3
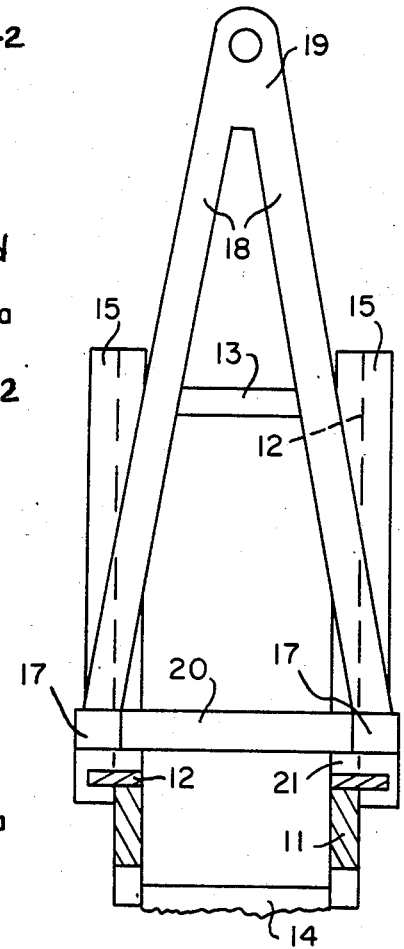
FIG. 4
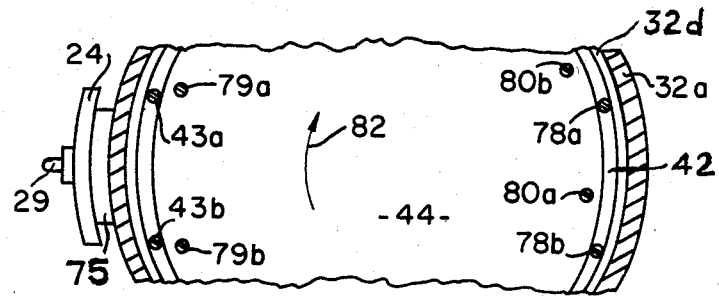
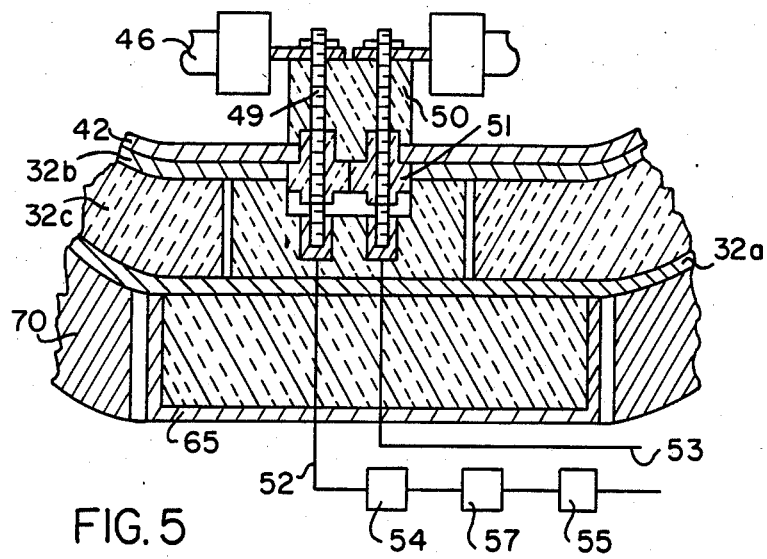
FIG. 6
FIG. 5

SOLAR COOKER

BACKGROUND OF THE INVENTION

A solar cooker that includes an oven mounted for adjustment to open directly toward the sun.

U.S. Pat. No. 4,249,511 to Krisst et al discloses a solar grill having a main parabolic reflector having a central opening and that reflects radiation to a secondary reflector having a concave, generally vertical reflecting surface which in turn reflects the radiation to a grill suspended from an outrigger. U.S. Pat. No. 4,378,790 to Erwin discloses a gimbal arrangement for supporting a food container in a horizontal condition even though the oven is pivoted about a vertical axis or a horizontal axis or the apparatus is subjected to pitch and roll. A cover is provided for the solar oven. U.S. Pat. No. 4,395,462 to Bunch discloses a system wherein the main reflector reflects radiation to an elongated receiver that extends away therefrom in a direction toward the sun. Secondary reflectors are mounted on the receiver.

In order to provide improvements in apparatus for cooking with solar energy as well as permit using the same apparatus for cooking when the sun is not shining, this invention has been made.

SUMMARY OF THE INVENTION

A solar cooker that includes an oven, a primary reflector joined to the oven to reflect solar radiation away from the oven to a secondary reflector which reflects the radiation into the oven, a gimbal arrangement for mounting the oven, and a subframe mounting the gimbal arrangement and mounted on an arcuate track to provide an adjustment for latitude. Preferrably there is provided an inner container removably mounted in the oven and mounting an electric heating coil for use when sufficient solar radiation is not available.

BRIEF DESCRIPTION OF THE DRAWINGS

FIG. 1 is a side view of the invention;

FIG. 2 is a fragmentary cross sectional view of the oven, and the gimbal shown in FIG. 1, other than the gimbal rings are shown in the same planes rather than being angularly inclined relative to one another as in FIG. 1;

FIG. 3 is a fragmentary cross sectional view generally taken along the line and in the direction of the arrows 3—3 of FIG. 2;

FIG. 4 is a fragmentary view generally taken along the line and in the direction of the arrows 4—4 of FIG. 1 other than the oven and reflectors are not shown;

FIG. 5 is an enlarged fragmentary cross sectional view to show the electric plug-in feature of the removable inner container;

FIG. 6 is a fragmentary cross sectional view generally taken along the line and in the direction of the arrows 6—6 of FIG. 2; and FIG. 7 is a fragmentary side view showing a mounting lug that is joined to the oven, and also showing the stud that extends into the lug slot in cross section.

Referring to the drawings the solar cooker of this invention includes a main frame mounted on a suitable stand 10, the main frame including a pair of parallel horizontal frame members 11, a pair of parallel uprights 12 joined to the one ends of frame members 11, and cross braces (only cross braces 13 and 14 being shown) joined to frame members 11 and uprights 12. A pair of elongated arcuate tracks 15 which extend arcuately through angles of about 90° have their upper ends welded to the upper ends of bars 16 that extend parallel to the uprights and are joined to the ends of frame members 11 remote from the uprights 16. Each track has its lowermost part welded to the adjacent horizontal frame member 11 at a location spaced from, but more closely adjacent to bars 16 than to uprights 12.

A subframe that is somewhat U-shaped as viewed from the side includes a pair of parallel web frame members 17, a pair of parallel generally V-shaped frame members that each has one of its legs 18 joined to the respective end of one of frame members 17 and the other of its legs 18 joined to the other end of the respective frame member 17. Extending between and joined to the one ends of frame members 17 is a cross brace 20 while another cross brace 20 is likewise joined to the opposite ends of frame members 17.

To mount the subframe for adjustable movement on the tracks 15 there is provided four generally U-shaped clamp members 21. One leg of each clamp member is welded to an end portion of each web frame member 17 such that the clamp members depend therefrom and the clamp members on one of the web frame members opens toward the other. The clamp members one legs abut against the top surfaces of the tracks while their other legs extend in positions to abut against the opposite surfaces of the tracks. A clamp screw (not shown) is threaded into said other leg of each clamp member to abut against a track to retain the subframe in an adjusted position along the length of the tracks.

As may in part be noted the tracks are of widths to extend transversely outwardly of members 11, 12 and 16. This in conjunction with the dimensions of the clamp members permits the subframe to be slide off either ends of the tracks when the clamp screws are loosened.

A gimbal is mounted by the apex portions 19 of the V-shaped frame members, the gimbal including a large diameter mounting ring 24 that has a pair of diametrically opposite pivot members 25 joined thereto to extend radially outwardly thereof and are pivotally mounted by the apex portions of the V-shaped frame members. A clock drive 26 is mounted by one of the V-shaped frame members and connected to one of the pivot members 25 for rotating it about its pivot axis at an angular rate of 360° in 24 hours. A smaller diameter ring 28 has diametrically opposite pivot members 29 joined thereto to extend outwardly thereof and are pivotally mounted by ring 24 so that their pivot axes are located in the same plane as the pivot axes of pivot members 25, but extend at right angles thereto. Nuts 30 are threaded on pivot members 29 for abutting against ring 24 to retain ring 28 in various selected adjusted pivotal positions relative to ring 24.

An oven 32 has three equally angularly spaced lugs 75 welded or otherwise suitably attached to the outer metal wall 32a thereof to be axially more closely adjacent to the open end of the oven than to the other end thereof. Three studs 76 are joined to the inner surface of ring 28 to extend radially inwardly thereof for being moved into the somewhat L-shaped slots 76 that are formed in the lugs. Assuming the upper edge of ring is located in a horizontal plane and the central axis of the oven is perpendicular to said plane, the slots are formed such that the long legs of the slots extend generally horizontally to open at their one ends through the one edges of the lugs while their other ends open to the lower ends of the short legs of the slots. As a result, upon moving the oven downwardly into ring 28 until the slots are at the same elevation as the long legs of the slots, then rotating the oven in the direction of arrow 85 relative to the studs and thereafter allowing the oven to move downwardly in the short legs, the oven is removably retained by ring 28 to pivot therewith during normal usage of the apparatus of this invention. In place of providing the studs and lugs, ring 28 may be formed of two semi-circular parts having ears (not shown) at opposite ends for being bolted to form a clamp ring for releasably clamping the oven.

The oven includes a cylindrical shaped portion that is open at one end and closed at the other by a bowl shaped portion. The oven has the outer metal wall 32a that advantageously has a radially outextending flange for being joined to the primary reflector 34, an inner metal wall 32b that terminates at a lower elevation than the outer wall, an intermediate insulated wall 32c, and an insulating annular seal member 32d extending radially between walls 32a, 32b and abutting against the upper terminal edge of the insulated wall.

Joined to the oven to extend radially and axially away therefrom is the parabolic main reflector 34. Even though the main reflector is shown as being joined to a flange of the outer wall 32a, it is to be understood the main reflector can have an annular cylindrical flange (not shown) that extends axially along wall 32a and between the wall and ring 28 to be clamped in a fixed axial position relative to the oven (assuming ring 28 is a clamp ring).

A tripod arrangement 35 has its legs mounted by the terminal edge portion of the main reflector that is remote from the oven. A secondary reflector 36 is mounted by one end of a jack member (grooved bar) 37 which in turn is mounted by a hand crank assembly 38 such that as the hand crank is turned the secondary reflector is translated toward or away from the main reflector. The crank assembly is mounted by the apex portion 35a of the tripod arrangement.

The main reflector has a terminal outer edge 34a that is of a diameter many times greater than the inner diameter of the open end of the cylindrical portion of the oven. Further the secondary reflector has an outer terminal edge 36a that is of a diameter substantially the same as that of the inner diameter of the oven cylindrical portion. The secondary reflector is axially centered with reference to the extension of the central axis of the cylindrical portion of the oven and remains axially centered when it is moved toward and away from the oven. That is the radii of the circumferential radially outer edges of the reflectors eminate from or closely adjacent to the extension of central axis of the oven cylindrical portions.

The main reflector is of a concave shape while the secondary reflector is of a convex parabolic shape. The two reflectors are shaped to magnify the incoming radiation while keeping the rays parallel as they enter the oven. The temperature in the oven can be controlled by, for example, moving the secondary reflector toward the primary reflector whereby fewer of the rays impinging on the concave reflective surface 34b of the main reflector will be reflected back into the oven.

An inner container 42 that is of a shape to form a close fit with the inner wall of the oven is removably inserted into the oven. Preferably the inner surface of the container 42 is black. A pair of handles 43, 78 are joined to the diametric opposite portions of the diametrically enlarged flange at the upper terminal edge of the inner container to extend thereabove, this flange being seatable in an annular cut-out provided in the seal member. Handles 43, 78 are U-shaped and are provided to facilitate removing the container from the oven, and inserting it into the oven.

A glass cover 44 having two spaced panels of glass (or a suitable plastic) is suitably removably mounted by the inner container open end portion. Advantageously the cover and inner container are provided with mating threaded portions (not shown) such that the cover has to be turned only a fraction of a complete turn for rotating the cover between a closed condition to retain it closed and a release condition whereby the cover may be lifted off the container. In such an event generally U-shaped handles 70, 80 are joined to the cover such that with the cover in a closed condition handle 79 is adjacent to handle 43. The web portions of handles 79, 80 are of a larger dimension than those of handles 43, 78, for example $\frac{1}{2}$". Further in the cover closed conditions the web of handles 79, 80 are at a higher elevation than those of handles 43, 78, for example about a $\frac{1}{2}$".

In the cover closed condition legs 43b, 79b of handles 43, 79 are nearly angularly aligned while leg 79a of handle 79 is located a few degress angularly in the direction of arrow 82 relative to leg 43a of handle 43. The angular. location of leg 78b of handle 78 in the direction of arrow 82 relative to leg 80a of handle 80 is greater than that of leg 79a relative to leg 80b of handle 80. By, for example, grasping legs 78a, 80b between the forefinger and thumb of one hand and squeezing, leg 80b can be moved to be substantially angularly aligned with leg 78a (rotate the cover in the direction of arrow 82) to turn the cover to its release condition. To turn the cover to its closed condition, legs 43b, 79b can be similarly grasped to turn the cover in the direction opposite arrow 82 to its closed condition.

In order to permit using the oven when the sun is not shining or insufficient radiation is available, an electric coil 46 is mounted in spaced relationship to the bottom wall of the inner container by insulator mounts 48. Prongs 49 are attached to opposite ends of the coil and extend through insulator plug mounting portions 50, 51 and an opening in the bottom of the container. Plug mounting portions 50, 51 and nuts threaded on the prongs serve to retain the prongs in a fixed position relative to the container bottom wall while the prongs are electrically insulated from the inner container, and the prongs can be separated from the inner container. An electrical receptacle 56 is provided in the bottom portion of the oven for having the prongs removably plugged thereinto. Electric lines 52, 53 are electrically connected to the receptacle, a thermostat 54, an indicator light 57 and an on-off switch 55 are mounted by a cover 65 that is suitably removably secured to the bottom of the oven and is filled with insulation (members 54, 55, 57 only being schematically. shown in FIG. 5).

In order to support the pan 63 or other suitable structure for supporting the food to be cooked there is provided a gimbal arrangement that includes a smaller diameter ring 60 that is mounted between and in fixed relationship to the lower ends of parallel arms 61 which are diametrically opposite one another. The upper ends of the arms are pivotally connected to a larger diameter ring 58 by diametrically opposite pivots 59. Diametrically opposed pivots 62 having pivot axes perpendicular to the pivot axes of pivots 59 and located in the same plane are mounted by ring 58 to extend radially outwardly thereof. Pivots 59 may be pivotally mounted by pivot mounts 67 that are attached to the inner container or into slots (not shown) in said container. As a result of providing the gimbal arrangement the pan remains in a horizontal condition during normal movement of the inner container.

A suitable annular support ring (not shown) is provided on the table for supporting the inner container in an upright condition when it is removed from the oven, the axial height of the support ring being greater than the dimension that the prongs extend below the bottom wall of inner container.

The radius of curvature of the upper surfaces of the tracks eminates from the pivot axes of pivots 29 when the pivot axes extend parallel to cross braces 20 (when ring 24 is pivoted such that the minimum vertical distance from each of the horizontal frame members 11 to the pivot axis of pivots 29 is the same). In order to permit the desired angular movement of the main reflector about the pivot axes of the pivots 25, 29 without abutting against the subframe, ring 28 is spaced from the reflector 34, but is closer to reflector 34 than the bottom of the oven. Further due to the diameter of the main reflector being so much greater than the diameter of the oven and the weight of the main reflector and the structure mounted on the main reflector, there are much greater forces tending to result in the oven and reflector structure pivoting to an undesirable position. In view of the above a lead weight 70 is attached to bottom of the oven.

By loosening the clamp screws the subframe can be adjustably positioned on the tracks for the particular latitude of the place at which the solar cooker is to be used. The pivotal adjustment of ring 28 relative to ring 24 provides an adjustment for the day of the calender year during which the invention is being used. In order that the oven be pivoted so that the sun rays entering the oven are substantially parallel to the central axis of the cylinder portion of the oven, the clock motor 26 is set for the time of day food is placed in the oven and turned so that ring 24 rotates about the pivot axes of pivot 25 at a rate it would pivot 360° in 24 hours. The clock drive motor 26 may be of a type that it is hand wound or of a type that is electrically driven.

As an example of the invention and not as a limitation thereon the main reflector edge 34a may be of a diameter of about 4 ½ feet when the secondary reflector edge 36a may be of a diameter of about 1 foot.

To minimize water vapor condensing on either or both of the glass panels of the cover, a desiccant may be inserted in the chamber between the two panels. During heating the desiccant releases water vapor and thus renews the capability of water absorption after each use. Also, to prevent a dangerous pressure build up within the inner container during the cooking operation, instead of being provided with a vent, the cover may form a sufficiently loss fit with the inner container to permit the escape of gases while still being of a type to be removably attached to the container.

What is claimed is:

1. A solar unit comprising a solar oven having an open end, a generally concave parabolic main reflector joined to the oven to move therewith and reflect solar radiation away from the oven, said main reflector having a central opening opening to the oven open end, a generally parabolic convex secondary reflector for reflecting radiation from the main reflector through the central opening to the open end of the oven, means for mounting the secondary reflector on the main reflector for movement therewith, a frame, and means for mounting the oven on the frame for adjustable movement relative to the frame to permit adjusting the angular position relative to the earth, the last mentioned means including means for supporting the oven including first and second pairs of pivot members that respectively have a first pivot axis and a second pivot axis that extends perpendicular to the first pivot axis, the oven extending between each of the first pivot members and each of the second pivot members.

2. The solar unit of claim 1 wherein the means for mounting the oven for adjustable movement includes means for mounting the supporting means on the frame for arcuate movement relative thereto.

3. The apparatus of claim 1 wherein said unit is a solar cooker; further characterized in that there is provided means for supporting food to be cooked in the oven, and means mounted in the oven for mounting the food supporting means for pivotal movement about each a third and a fourth pivot axis that extend perpendicular to one another.

4. A solar unit comprising a solar oven having an open end, a generally concave parabolic main reflector joined to the oven for reflecting solar radiation away therefrom, said main rereflector having a central opening opening to the oven open end, a generally parabolic convex secondary reflector for reflecting radiation from the main reflector through the central opening to the open end of the oven, means for mounting the secondary reflector on the main reflector, and means for mounting the oven for adjustable movement to permit adjusting the angular position of the oven relative to the earth, the means for mounting the oven including a gimbal for mounting the oven and having first pivot axes and second pivot axes extending perpendicular to the first pivot axes, a frame and means for mountwng the gimbal on the frame for pivotal movement about the first pivot axis, the means for mounting the gimbal including an elongated track arcuately curved about the first pivot axes and means adjustably positionable along the track for supportingly mounting the gimbal in spaced relationship to the track.

5. The solar unit of claim 4 further characterized in that the gimbal includes a ring and pivot means for mounting the ring on the gimbal mounting means for pivotal movement about the second pivot axes, and that there is provided clock drive means connected to the pivot means for pivoting the pivot means at a rate of 360° every 24 hours.

6. The solar unit of claim 4 further characterized in that the gimbal includes a ring and pivot means for mounting the ring on the gimbal mounting means for pivotal movement relative thereto, and that the gimbal mounting means comprises a subframe that includes parallel frame members having one end portions mounting the pivot means, and opposite end portions, frame means joined to the opposite end portions for retaining the parallel frame members in parallel relationship and means joined to at least one of the frame members and frame means for releasably clampingly engaging various selected portions of the track along the length thereof.

7. A solar cooker comprising a solar oven having an open end, a generally concave parabolic main reflector joined to the oven for reflecting solar radiation away therefrom, said main reflector having a central opening to the oven open end, a generally parabolic convex secondary reflector for reflecting radiation from the main reflector through the central opening to the open end of the oven, means for mounting the secondary reflector on the main reflector, means for mounting the oven for adjustable movement to permit adjusting the angular position of the oven relative to the earth, an inner container removably insertable into the oven, means for supporting food within the container and gimbal means mounted in the inner container for supporting the food supporting means.

8. The solar cooker of claim 7 further characterized in that the inner container and oven each have a bottom portion, and that there is provided means that at least in part extends intermediate the food supporting means and the container bottom portion for electrically heating food.

9. The solar cooker of claim 8 further characterized in that the electric heating means includes electrically conductive prongs extended through the container bottom portion and that there is provided an electric receptacle mounted by the oven bottom portion for having the prongs plugged thereinto.

10. The solar cooker of claim 8 further characterized in that the oven mounting means includes a frame, second gimbal means for mounting the oven for pivotal movement about a first pivot axis and a second pivot axis that extends perpendicular to the first pivot axis and means mounted by the frame for mounting the second gimbal means for pivotal movement about one of said first and second pivot axes.

11. A solar unit comprising an oven having an open end, reflector means joined to the oven for reflecting solar radiation into the oven, a frame, a subframe, gimbal means mounted by the subframe and mounting the oven for pivotal movement relative to the subframe about a first pivot axis and a second pivot axis that extends perpendicular to the first axis and means mounted on the frame for mounting the subframe for pivotal movement relative to the frame about the first pivot axis, the means for mounting the subframe on the frame including an arcuately elongated track having a radius of curvature eminating from the first pivot axis and clamp means for retainthe subframe in various selected adjusted positions along the length of the track.

12. The solar unit of claim 11 further characterized in that the subframe includes a pair of elongated parallel frame members having one end portions remote from the track that mount the gimbal means for pivotal movement relative to the track about the second pivot axis.

13. A solar cooker comprising an oven having an open end and a bottom portion opposite its open end, reflector means joined to the oven for reflecting solar radiation into the oven, a frame, a subframe, gimbal means mounted by the subframe and mounting the oven for pivotal movement relative to the subframe about a first pivotal axis and a second pivotal axis that extends perpendicular to the first axis, means mounted on the frame for mounting the subframe for pivotal movement relative to the frame about the first pivotal axis, gimbal means within the oven for supporting food to be cooked and an electrical heating coil between the bottom portion and the last mentioned gimbal means for heating food when there is insufficient solar radiation available for heating the food.

14. The solar cooker of claim 13 further characterized in that there is provided an inner container removably insertable into the oven and having a bottom portion and an open end, the last mentioned gimbal means being mounted in the inner container and the electric coil being mounted in the inner container adjacent to its bottom portion, an electric receptacle mounted by the oven bottom portion, an electric plug connected to the coil and mounted by the container bottom portion and weight means attached to the oven bottom portion.

15. The solar cooker of claim 13 further characterized in that the oven has a cylindrical portion which has a central axis and one end that comprises the oven open end, and an opposite end to which the oven bottom portion is joined, the oven bottom portion being bowl shaped, and that the reflector means includes a generally parabolic main reflector joined to the cylindrical portion for reflecting solar radiation away therefrom, the main reflector having a central opening opening to the open end of the oven and a terminal edge that is of a diameter many times larger than the diameter of the oven open end, a secondary parabolic reflector mounted in axial alignment with the central portion for reflecting solar radiation from the main reflector into the oven, the secondary reflector having a terminal circumferential edge of about the same diameter as the diameter of the oven opening.

16. A solar unit comprising an oven having an open end, reflector means joined to the oven for reflecting solar radiation into the oven, a frame, a subframe, gimbal means mounted by the subframe and mounting the oven for pivotal movement relative to the subframe about a first pivot axis and a second pivot axis that extends perpendicular to the first axis, the gimbal means including a first ring, pivot means for pivotally mounting the first ring on the subframe for pivotal movement about the second pivot axis, a second ring that mounts the oven and is of a smaller diameter than the diameter of the first ring and means for mounting the second ring for pivotal movement relative to the first ring about the first pivot axis and retain the second ring in various angularly adjusted positions relative to the first ring, drive means connected to the pivot means for pivoting the first ring about the second axis at an angular rate of 360° every 24 hours, and means mounted on the frame for mounting the subframe for pivotal movement relative to the frame about the first pivot axis.

* * * * *